United States Patent [19]

Appelson

[11] Patent Number: 4,497,515
[45] Date of Patent: Feb. 5, 1985

[54] STAKE-OUT CURTAINS FOR AUTOMOBILES

[76] Inventor: Jay M. Appelson, 2211 W. 71st St., Prairie Village, Kans. 66208

[21] Appl. No.: 479,641

[22] Filed: Mar. 28, 1983

[51] Int. Cl.³ .............................................. B60J 1/02
[52] U.S. Cl. .................................. 296/141; 296/97 D; 296/97 G; 160/290 R; 350/601
[58] Field of Search ............... 296/138, 140, 141, 143, 296/97 C, 97 G; 160/265, 290, DIG. 7; 180/286, 289; 70/144; 350/291

[56] References Cited

U.S. PATENT DOCUMENTS

| 1,891,098 | 12/1932 | Kurth | 160/265 |
| 2,594,813 | 4/1952 | Seibert | 160/290 R |
| 2,595,833 | 5/1952 | Flaherty | 296/97 D |
| 4,372,419 | 2/1983 | Bennett et al. | 292/144 |

Primary Examiner—Robert R. Song

[57] ABSTRACT

Stake-out curtains for automobiles consisting, with respect to a window of an automobile, of a pliable sheet of one-way viewing material wound on a spring roller and extendable therefrom to cover the window and secured in its extended position by electromagnetic means, an operating circuit for the electromagnetic means so arranged that said electromagnetic means will be actuated, and the one-way viewing sheet reeled on its roller, whenever the automobile engine is started.

10 Claims, 3 Drawing Figures

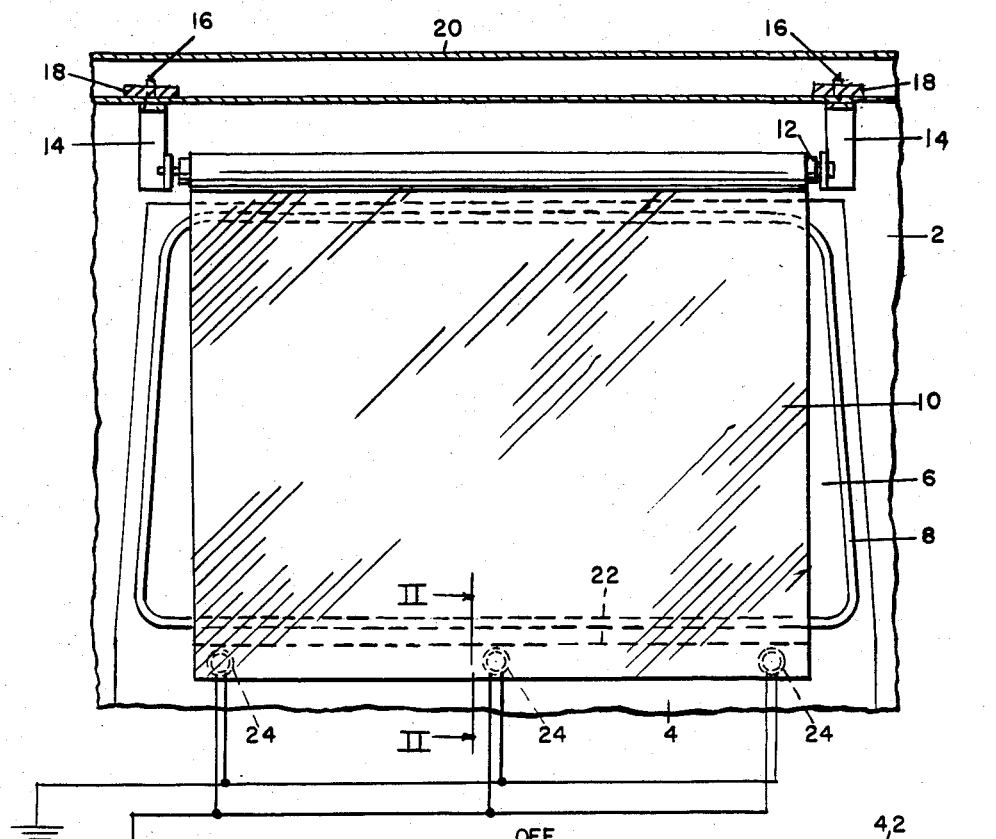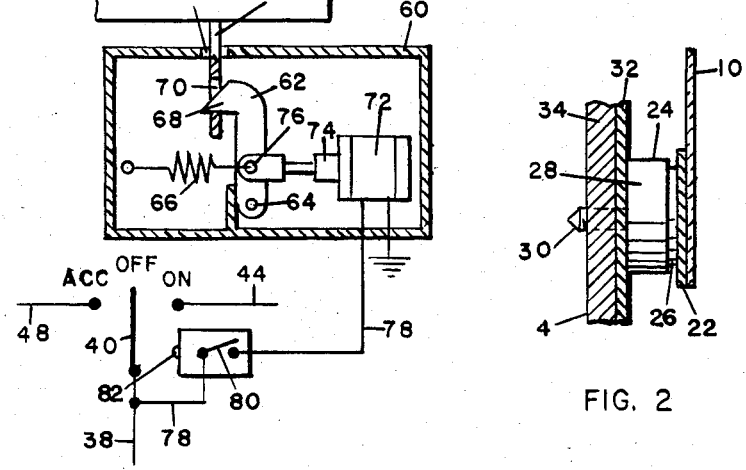

STAKE-OUT CURTAINS FOR AUTOMOBILES

This invention relates to new and useful improvements in vehicles used by police officers and other law enforcement personnel, and has particular reference to stake-out curtains for use in such vehicles.

Law enforcement officials often have need to maintain continuous and surreptitious observation of buildings or other locations, sometimes over extended periods of time. It is often desirable that they should be able to maintain such surveillance from automobiles, but it is usually difficult to do so for any length of time, since persons remaining in parked cars for extended time periods become highly obvious, and attract both notice and suspicion.

The primary object of the present invention, accordingly, is the provision of a means whereby persons may remain in an automobile for any desired length of time, and maintain close observation of the surroundings, without themselves being noticeable or even visible to persons outside of the automobile. Many persons other than law enforcement officials, such for example as ordinary tourists, would be able to feel safe while sleeping in their vehicles, as is sometimes desirable or necessary, if persons outside the vehicle could not see them, or even know that the vehicle was occupied.

The invention involves the use of coverings for the vehicle windows which are formed of a one-way viewing material, that is, a material through which vision may be had in one direction but not the other, so long as the ambient light at the side thereof from which vision is to be had is lower than that at the opposite side. The mechanics by which this function is accomplished are well known and need not be described in detail in this application. Often they involve the use of narrow, spaced apart reflective strips, or reflective particles, either applied to the surface of or embedded in a panel of otherwise transparent material, so that from the darker side of the panel the strips or particles do not reflect light and vision may be had therebetween, while at the lighter side of the panel the strips or particles do reflect light, and create the appearance of an apparently unbroken, mirror-like reflecting surface. Such materials are commonly available, both in the form of substantially rigid panels of glass or plastic, such as the common "one-way mirror", and also in the form of pliable sheets or films, usually formed of a plastics material. In the present concept, coverings of such material may be applied over any or all of the windows of a vehicle, including the windshield and rear window as well as the side windows, so that an outside observer viewing the vehicle will see only reflected images of himself and his surroundings, not the interior of the vehicle.

However, while such window coverings of one-way viewing material do permit observations by persons occupying a vehicle, they do so only imperfectly. Depending on the material used, some authorities estimate a reduction of visual quality and brilliance of as much as 50%. Therefore, the use of such window coverings during actual driving is not considered to be either desirable or in the best interests of driving safety. Accordingly, another object is the provision of a stake-out curtain of the character described which is provided with a quickly and easily detachable means for securing it over a vehicle window, so that the curtains may be quickly and easily removed whenever it may be desired to drive the vehicle.

A further object is the provision of a stake-out curtain of the character described in which the one-way viewing material has the form of a pliable film wound on a spring roller mounted adjacent the window and biased to wind the film thereon, but from which the film may be manually extended to cover the window, and secured in its extended position by a latch, so that when the latch is released, the film will be automatically rewound on said roller to a "self-storing" position.

A still further object is the provision of a stake-out curtain as described wherein said latch is electromagnetic, and has an operating electrical circuit so interrelated with the ignition system of the vehicle that it is released automatically whenever the ignition switch is closed. Thus the curtain is moved out of the way to its self-storing position without the attention of the driver if the vehicle must be started and driven on extremely short notice, as is frequently necessary in stake-out work.

Other objects are simplicity and economy of construction, and efficiency and dependability of operation.

With these objects in view, as well as other objects which will appear in the course of the specification, reference will be had to the accompanying drawing wherein:

FIG. 1 is an inside elevational view of the upper portion of a single automobile door, showing a stake-out curtain embodying the present invention operatively applied thereto, and including a schematic wiring diagram of the control system, FIG. 2 is an enlarged, fragmentary sectional view taken on line II—II of FIG. 1, and FIG. 3 is an enlarged, fragmentary view similar to FIG. 1, but showing a modification of structure and control.

Like reference numerals apply to similar parts throughout the several views, and in FIG. 1 the numeral 2 applies to the body of an automobile. FIG. 1 shows an inside elevational view of a portion of one side wall of the body, which includes one door 4 which opens outwardly in the usual manner. In its upper portion, said door includes a window 6 having a frame 8, the window glass of which may be lowered and raised, all as is common in the art. The stake-out curtain contemplated by the present invention includes a sheet 10 of pliable plastic film, treated to provide the previously discussed one-way viewing effect. Said sheet is attached at its upper edge to a roller 12 disposed above and generally parallel to the upper edge of window 6, and mounted at each end in a bracket 14 which may be affixed, as by screws 16, to any rigid portion of the body, such as to internal reinforcing beams 18 of the body roof 20. The roller is continuously biased to turn axially in a direction to wind sheet 10 thereon, by means of a torsion spring mounted internally in the roller itself. The mechanical details of spring rollers of this type are old and well known, and therefore are not here shown. Such rollers are identical in all pertinent respects to ordinary window shade rollers. The lower edge of the sheet, adjacent roller 12, may be grasped and pulled downwardly by manual force, thereby turning said roller against its spring bias, to extend said sheet downwardly, to cover the associated vehicle window 6 substantially completely, as shown in FIG. 1. The sheet may be tailored to fit any given window shape.

Extending along the lower or free edge of sheet 10, and tightly bonded thereto, is a thin stiffener strip 22 of steel or other ferrous metal capable of being attracted by a magnet. Even a flexible adhesive tape may be used for this purpose, so long as it is impregnated with ferrous particles. As shown in FIGS. 1 and 2, said strip may be applied to and be retained by magnetic attraction against one or more (three shown) electromagnets 24 secured to the inner surface of door 4 just below window 6, as long as said magnets are energized, thereby securing sheet 10 in its downwardly extended use position. As shown in FIG. 2, the pole 26 of each magnet faces inwardly from the door, strip 22 being affixed to the outer surface of sheet 10, and the case 28 of the magnet is secured to the door by a screw 30 which projects through any decorative inner facing 32 of the door and engages in the steel inner structure of the door.

Electromagnets 24 are controlled electrically by a system interrelated with the electrical system of the automobile. As illustrated in the simplified diagram of FIG. 1, the vehicle battery 36 is connected by a wire 38 to the switch arm 40 of the key-operated ignition switch. Said switch arm has a central "OFF" position, but may be turned in one direction to its "ON" position to connect the battery to the ignition system 42 of the automobile through a wire 44, or turned in the opposite direction to its "ACC" position to deliver current only to the accessories 46, through a wire 48. The accessories may include, for example, the radio. In accordance with the present invention, switch arm 40 is provided with an extra contact 50 at its "ACC" position, said contact being closed when the switch arm is in that position to delivery operating current through wire 52 to electromagnets 24, which are connected in parallel. A manually operable onoff switch 54 is interposed in wire 52. The curtain, as described, may of course be applied to any or all of the vehicle windows, including the windshield and rear window. When used on doors as shown, the delivery of operating power to electromagnets 24 requires the use of a slack electrical cable at the hinged edge of each door. In the interests of economy, since the one-way viewing material is relatively expensive, each curtain could be formed principally of a totally opaque film, which is relatively inexpensive, with only a rather small "window", or strips, of the one-way viewing material.

In operation, to ready the stake-out curtains for use, the occupant first moves switch arm 40 to its ACC position, which of course requires the use of the proper ignition key, and closes switch 54, thereby energizing electromagnets 24. Wire 52 may be branched to each vehicle window, and each branch equipped with a separate switch 54, in order that only the magnets associated with the windows in connection with which use of the stake-out curtains may be desired in any particular circumstance need be energized. This permits reduction of the drain on the vehicle battery represented by the current load of maintaining the magnets energized. The curtains may then be manually extended and the ferrous strips 22 at their lower edges placed against magnets 24, so that the curtains are effectively "latched" in their use positions covering the vehicle windows. The vehicle occupants may utilize the vehicle accessories, to which current is then supplied through wire 48 if they so desire, though there is no requirement that they do so. If use of the stake-out curtains is not required in any particular situation, switch 54 may be opened to avoid battery drain.

Whenever it is necessary to drive the vehicle, and such necessity often arises suddenly and without warning in stake-out work, the driver must of course turn the ignition key to the ON position. When he does so, in fact as soon as switch arm 44 leaves its ACC position, the current supply to electromagnets 24 is interrupted, and one-way viewing sheets 10 are almost instantly reeled onto spring rollers 12, so as to leave windows 6 unobstructed for better driving safety. This movement of the curtain sheets from "use" positions covering the vehicle windows, to "storage" positions leaving the windows unobstructed, is almost instantaneous, and is almost automatic, requiring no conscious action by the driver other than those he would normally perform in starting the vehicle engine.

While the structure shown is extremely simple and economical, it will be seen that still greater simplicity could be afforded by placing electromagnets 24 at the top of the window, and suspending curtain sheet 10 magnetically therefrom, so that it hangs downwardly by gravity, and simply drops into the vehicle interior when the magnets are de-energized. Further, even permanent magnets could be utilized, either at the top or at the bottom of the window, although this would require manual dislodgement of the curtain therefrom. However, one-way viewing material of the type described is rather fragile and subject to damage by wrinkling, folding, or rough handling thereof, so that the spring-roller type of curtain storage, as shown, is preferred. The use of electromagnets, with the automatic control enabled thereby, is preferred in view of the speed, convenience and safety provided thereby. It is to be noted also that the curtains in no way interfere with the raising or lowering of vehicle windows, and hence do not interfere appreciably with the adequate ventilation of the vehicle interior.

FIG. 3 shows a modification of structure utilizing a mechanically engaged, electromagnetically released latch in place of the electromagnets 24 of FIGS. 1-2. In FIG. 3, the stiffener strip 22 at the lower edge of window sheet 10 is provided with a downwardly projecting tongue 56 which, as the sheet is extended from its spring roller, is inserted through an opening 58 in the top of a latch case 60 mounted on the interior surface of the vehicle door just below the window level. As it is inserted, the tongue cams a latch bar 62, which is pivoted in the case at 64, to one side against the tension of a spring 66, the toe 68 of the latch bar being snapped by said spring into engagement with an opening 70 of said tongue when the latter is fully inserted, thereby securing curtain sheet 10 in its extended use position. A solenoid coil 72 having a movable core 74 is also mounted in case 60, and said core is connected to latch bar 62 at 76 so that whenever coil 72 is energized, the movement of core 74 will retract latch toe 68 from tongue opening 70, thereby releasing the latch and permitting curtain sheet 10 to be rewound on its spring roller. The coil of the solenoid, which of course also constitutes an electromagnetic device, is supplied with operating electric current from bettery wire 38 through a wire 78 in which is interposed a normally open electric switch 80. Switch 80 is of a momentary closure type, such that it will remain closed for only a short period of time whenever its operating push button 82 is depressed, and will not again close until said pushbutton is released and again depressed. Said pushbutton is so disposed as to be depressed by switch arm 40 of the vehicle ignition system whenever said switch arm is moved to its ON position. Otherwise than as stated, the operation of the FIG. 3 form is identical to that of the form shown in FIGS. 1-2.

While somewhat more intricate than the species of the invention shown in FIGS. 1-2, and hence somewhat more expensive, the FIGS. 3 species has the advantage that it requires no continuous flow of electric current to maintain continuous energization of a series of electromagnets, and only a short surge of current to release any reasonable number of curtain latches, and hence does not entail any appreciable drain on the vehicle battery.

While I have shown and described certain specific embodiments of my invention, it will be readily apparent that many minor changes of structure and operation could be made without departing from the spirit of the invention.

What I claim as new and desire to protect by Letters Patent is:

1. A stake-out curtain for an automotive vehicle window, said curtain comprising:
   a. a curtain comprising a sheet at least a portion of the area of which is formed of one-way viewing material of a type such that substantial vision may be had therethrough only from the side thereof at which ambient light is lower than that at its opposite side, and
   b. quick-release attaching means to secure said curtain releasably in a use position overlying said vehicle window, whereby to permit outward vision through said window from the interior of said vehicle, but not vision into said vehicle from points external thereto, so long as ambient light outside of said vehicle is greater than that inside of said vehicle.

2. A stake-out curtain as recited in claim 1 wherein said attaching means includes a magnet and a ferrous member capable of being attracted to a magnet, said magnet and ferrous member being mounted, not necessarily respectively, on the vehicle body adjacent said window, and on said curtain.

3. A stake-out curtain as recited in claim 2 wherein said magnet constitutes an electromagnet having an operating electric circuit, and wherein said attaching means further includes operating means operable to interrupt said circuit.

4. A stake-out curtain as recited in claim 3 wherein said operating means includes an electric switch so interrelated to the ignition switch of said vehicle that said circuit is interrupted whenever said ignition switch is closed to permit starting of the vehicle engine.

5. A stake-out curtain for an automotive vehicle window, said curtain comprising:
   a. a curtain comprising a sheet of one-way viewing material of a type through which substantial vision may be had only from the side thereof at which ambient light conditions are lower than at the opposite side thereof,
   b. means operable to mount said curtain on said vehicle for movement between a storage position not overlying said window to a use position overlying said window, said curtain being manually movable from said storage position to said use position,
   c. resilient means biasing said curtain continuosly toward said storage postion,
   d. latch means operable to secure said curtain releasably in said use position, and
   e. release means operable to disengage said latch.

6. A stake-out curtain as recited in claim 5, wherein said curtain comprises a pliable sheet, and wherein said mounting means for said curtain comprises a roller mounted rotatably on said vehicle adjacent said window, said curtain being wound on said roller and being extendable therefrom, and wherein said biasing means operates to bias said roller to turn in a direction to wind said curtain thereon.

7. A stake-out curtain as recited in claim 5 wherein said latch means is electromagnetically operated, having an operating electric circuit, said circuit including switching means operable remotely from said window to release said latch means.

8. A stake-out curtain as recited in claim 7 wherein said switching means is so interrelated to the ignition switch of said vehicle that said latch is released whenever said ignition switch is moved to a position permitting starting of the vehicle engine.

9. A stake-out curtain as recited in claim 8 wherein said latch means comprises one or more electromagnets secured to the vehicle adjacent said window, and a ferrous member affixed to said curtain to contact said magnet when the curtain is in its use position, and to be retained against said magnet by magnetic attraction so long as the magnet is energized by completion of its operating circuit, and wherein said switching means is operable to interrupt said circuit whenever the vehicle ignition switch is moved to a position permitting starting of the vehicle engine.

10. A stake-out curtain as recited in claim 8 wherein said latch means comprises a manually engageable mechanical latch having electromagnetic means operable by completion of its operating electrical circuit to disengage said latch, and wherein said switching means is operable to complete said circuit momentarily whenever said vehicle ignition switch is moved to a position permitting starting of the vehicle engine.

* * * * *